(12) United States Patent
Ni et al.

(10) Patent No.: US 10,108,705 B2
(45) Date of Patent: Oct. 23, 2018

(54) METHOD TO IMPROVE THE NAMED ENTITY CLASSIFICATION

(75) Inventors: Yuan Ni, Shanghai (CN); Zhao Ming Qui, Shanghai (CN); Lei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1500 days.

(21) Appl. No.: 13/292,111

(22) Filed: Nov. 9, 2011

(65) Prior Publication Data

US 2012/0185480 A1    Jul. 19, 2012

(51) Int. Cl.
*G06F 17/30* (2006.01)

(52) U.S. Cl.
CPC ................. *G06F 17/3071* (2013.01)

(58) Field of Classification Search
CPC .................................................. G06F 17/3071
See application file for complete search history.

(56) References Cited

U.S. PATENT DOCUMENTS

| | | | | |
|---|---|---|---|---|
| 5,632,022 A | * | 5/1997 | Warren et al. | 715/776 |
| 8,121,618 B2 | * | 2/2012 | Rhoads | G01C 21/20 |
| | | | | 455/456.1 |
| 8,301,438 B2 | * | 10/2012 | Ferrucci | G06F 17/30654 |
| | | | | 704/1 |
| 2010/0179936 A1 | | 7/2010 | Jeremiah | |
| 2010/0228693 A1 | * | 9/2010 | Dawson | G06F 17/2705 |
| | | | | 706/12 |
| 2011/0289520 A1 | * | 11/2011 | Grigoriev et al. | 719/331 |
| 2012/0154633 A1 | * | 6/2012 | Rodriguez | 348/231.99 |

FOREIGN PATENT DOCUMENTS

| | | |
|---|---|---|
| CN | 101499062 A | 8/2009 |
| CN | 101576910 A | 11/2009 |
| CN | 102436456 A | 5/2012 |

OTHER PUBLICATIONS

Office Action for Chinese Counterpart Application No. 201010506217.1, dated Jan. 6, 2014.
Office Action for Chinese Counterpart Application No. 201010506217.1, dated Sep. 4, 2014.
Vercoustre et al., "Using Wikipedia Categories and Links in Entity Ranking", Author manuscript, published in Proceedings of the Sixth International Workshop of the Initiative for the Evaluation of XML Retrieval (INEX 2007), Schloss Dagstuhl: Germany (2007).

(Continued)

*Primary Examiner* — Mark D Featherstone
*Assistant Examiner* — Navneet Gmahl
(74) *Attorney, Agent, or Firm* — L. Jeffrey Kelly (57) ABSTRACT

A method is described for providing a named entity classification in a computing system having a processor, comprising the steps of the processor reading, from an LOD (Linking Opening Data) set, an LOD node corresponding to a to-be-classified named entity. The processor also determining a type attribute of the LOD node corresponding to the to-be-classified named entity as a tagged type of the to-be-classified named entity and further reading a candidate type. Finally, the processor computing, based on the tagged type, a possibility of the to-be-classified named entity belonging to the candidate type.

16 Claims, 3 Drawing Sheets

(56) References Cited

OTHER PUBLICATIONS

Bunescu et al., "Using Encyclopedic Knowledge for Named Entity Disambiguation", Proceedings of European Chapter of the Association for Computational Linguistics, Sep. 16, 2006, pp. 9-16.
Cucerzan, "Large-Scale Named Entity Disambiguation Based on Wikipedia Data", Proceedings of 2007Joint Conference on Empirical Methods in Natural Language Processing and Computational Natural Language Learning, Jun. 2007, pp. 708-716.
AlchemyAPI™, "Linked Data Support", 2010, 2 pages.

* cited by examiner

METHOD TO IMPROVE THE NAMED ENTITY CLASSIFICATION

CROSS REFERENCES

This application takes priority under the Chinese application number 201010506217.1 incorporated by reference herein.

FIELD OF INVENTION

The present invention relates to the field of data processing, and more particularly relates to a method and an apparatus for named entity classification.

BACKGROUND OF THE INVENTION

Naming of entity classification is a crucial step of many applications. A named entity is essentially a word with a semantic meaning. For example, in an automated "Question" and "Answer" system, it is necessary to determine whether the type of a candidate answer conforms to the type as specified by a question. In an information extraction system, it is necessary to identify the type of a named entity so as to prepare for a subsequent extraction processing.

A traditional automatic classification system is based on machine learning. Specifically, a series of named entities of a known type are entered into an automatic classification system, with each named entity corresponding to a feature vector. The automatic classification system obtains a correspondence relationship between the feature vector and the type through machine learning. When the automatic classification system receives a to-be-classified named entity and its feature vector, it may classify the to-be-classified named entity based on the correspondence relationship.

For example, word-level information and its context information of the named entity itself may be used as elements of the feature vector. In this case, the feature vector of the named entity is a two dimensional vector. For a named entity "Smith", the word-level information is, for example, that the initial letter of the named entity is in capital, and the context information is, for example, that a word preceding this named entity is "Professor". The feature vector of this named entity is (initial letter in capital, following "Professor"). If the automatic classification system has mapped this feature vector to a type "person," then the named entity may be classified into the type of "person," instead of the type of "organization." The skilled in the art may understand that the feature vector and the type might not have a one-to-one correspondence relationship.

The prior art methods such as the one discussed above has many shortcomings. For example, such a method requires manual determination of appropriate types for a large amount of named entities to generate the training set, which will bring heavy workload. The development of Internet has presented even more challenges to the already existing problems in this are. Through the use of the internet, more and more information can be obtained on the web, and such information may help named entity classification.

Consequently, it is desirable to provide a solution that can help automatic classification of named entities that has some of the required information which provides currently the implementation of which provides difficult challenges for the prior art.

SUMMARY OF THE INVENTION

The shortcomings of the prior art are overcome and additional advantages are provided through the provision of a method of providing a named entity classification in a computing system having a processor, comprising the steps of the processor reading, from an LOD (Linking Opening Data) set, an LOD node corresponding to a to-be-classified named entity. The processor also determining a type attribute of the LOD node corresponding to the to-be-classified named entity as a tagged type of the to-be-classified named entity and further reading a candidate type. Finally, the processor computing, based on the tagged type, a possibility of the to-be-classified named entity belonging to the candidate type.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION

Hereinafter, as per one or more embodiments of the present invention a processor and a method of scheduling the processor are illustrated with reference to the accompanying figures as provided and discussed. In the following description, many specific details are illustrated so as to understand the present invention more comprehensively. However, the skilled in the art would appreciate that implementation of the present invention may not have some of these specific details, and the present invention is not limited to the particular embodiments as introduced. On the contrary, arbitrary combination of the following features and elements may be considered to implement the present invention, regardless of whether they relate to different embodiments or not. Thus, the following aspects, features, embodiments and advantages are only for illustrative purposes, and should not be understood as elements or limitations of the appended claims, unless otherwise explicitly specified in the claims. It should be further noted that in order to prevent the present invention to be blurred due to unnecessary details, only apparatus structures and/or processing steps closely related to the solution according to the present invention are shown in the accompanying drawings, while other details having little relation with the present invention are omitted. Additionally, unless deliberately limited with "direct" or "indirect", the term "connection" in the present application documents includes both direct connection and indirect connection.

Figure 1:
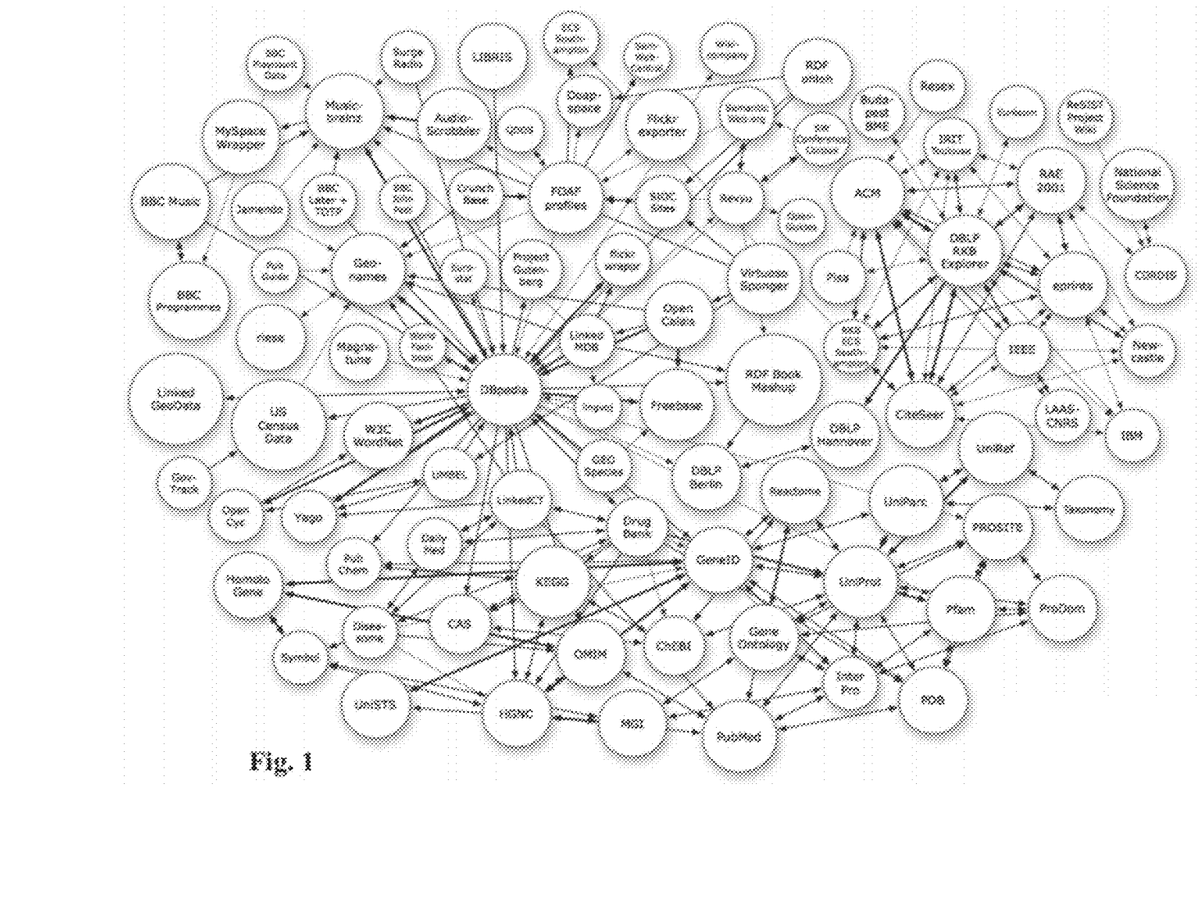
FIG. 1 is an illustration of one embodiment of the present invention showing an LOD data set.

A Linking Open Data (LOD) is a new web data form. An LOD data set may be regarded as a gigantic graphic data structure. FIG. 1 shows a schematic diagram of an LOD data set. This diagram is cited from http://richard.cyganiak.de/2007/10/lod/. Each LOD node in the LOD set is indicated by a uniform resource identifier (URI). An LOD node is a structured data form, which may comprise a plurality of property entries, for example, data type properties, name properties, etc. So far, the LOD program has included more than 100 LOD data sets and more than 4.2 billion property entries. In these property entries, nearly 8 million pieces are attribute entries of relevant types. The LOD node typically has a certain correspondence relationship with a web page, which is adapted to fact that LOD data sets are created by a great number of users on the web. For example, the LOD nodes inside the LOD data set dbpedia have a certain correspondence relation with web pages inside the wikepedia website.

A to-be-classified named entity very likely corresponds to one or more LOD nodes in an LOD data set. In other words, the to-be-classified named entity is identical or similar to some name attributes of the one or more LOD nodes. Moreover, each LOD node may already be tagged with at least one type. Thus, existing type information in the LOD data set may be used to help automatic classification of a named entity. This method of facilitating classification may be taken as a supplement or replacement to a machine learning-based method.

Figure 2:
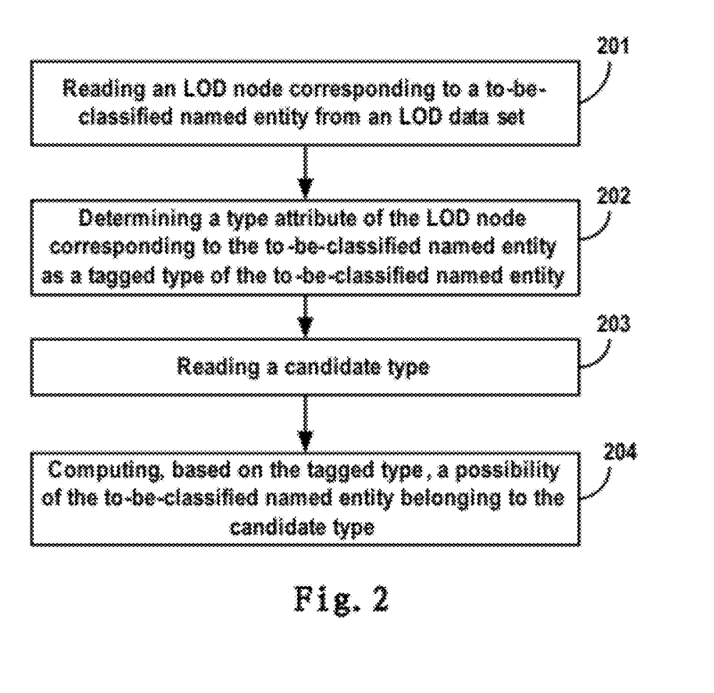
FIG. 2 is an illustration of a methodology of providing a named entity classification according to one embodiment of the present invention.

Firstly, reference is made to FIG. 2, which shows a method of named entity classification according to an embodiment of the present invention.

In Step 201, an LOD node corresponding to a to-be-classified named entity is read from an LOD data set.

As above mentioned, a to-be-classified named entity very likely corresponds to one or more LOD nodes in an LOD data set. Many existing methods may be used to find the LOD node(s) corresponding to the to-be-classified named entity, for example, a word-level approach, i.e., comparing character similarities between the to-be-classified named entity and the name attributes of the LOD node(s); and for another example, a semantic-level approach, i.e., comprising semantic similarities between the to-be-classified named entity and name attributes of the LOD node(s). Various kinds of specific approaches will not be detailed here.

In Step 202, a type attribute of a LOD node corresponding to the to-be-classified named entity is determined as a tagged type of the to-be-classified named entity.

Each LOD node might have been tagged with at least one type by a publisher, namely the LOD node may have at least one type attribute entry to specify the type attribute of the LOD node. These type attributes are tagged types of the to-be-classified named entity. If an LOD node corresponding to the to-be-classified named entity has a plurality of type attribute entries, then the type attributes as specified in these entries may be determined as the tagged types of the to-be-classified named entity.

In Step 203, a candidate type is read. An actual automatic classification system can only correspond to a limited size of type set. Each type of this type set may be the candidate type. In actual application, the automatic classification system always provides a subset of the type set, such that a type in this subset is determined as the candidate type. For example, a scenario is that the automatic classification system provides a to-be-classified named entity and then provides a plurality of candidate types, and then a possibility of the to-be-classified named entity belonging to each candidate type is provided with a method according to an embodiment of the present invention.

In Step 204, a possibility of the to-be-classified named entity belonging to the candidate type is calculated based on the tagged type. After obtaining the possibility based on the solution according to the embodiment of the present invention, the automatic classification system may use the possibility to perform automatic classification to the to-be-classified named entity. For example, in the case that the automatic classification system only provides one candidate type, the automatic classification system may set a possibility threshold; if the possibility of the to-be-classified named entity belonging to the candidate type is greater than the possibility threshold, then the to-be-classified named entity is ascribed to the candidate type. For another example, in the case that the automatic classification system provides a plurality of candidate types, the automatic classification system may classify the to-be-classified named entity to the candidate type corresponding to the maximum possibility.

Theoretically, if the classification system of the tagged type is consistent with the classification system of the candidate type, then the possibility of the to-be-classified named entity belonging to each candidate type may be directly determined based on the tagged type. Suppose a figure in the range [0,1] is used to indicate the possibility, where 1 indicates the highest possibility and 0 indicates the minimum possibility, and suppose the tagged type is "male," while the candidate types are "male" and "female," then it may be directly calculated that the possibility of the to-be-classified named entity belonging to the candidate type "male" is 1, while the possibility of belonging to the candidate type "female" is 0.

Due to the arbitrary nature of web data, the classification system of the tagged type and the classification system of the candidate type may be different. For example, for an LOD node in an LOD data set, its name attribute is "Einstein", and its tagged type is "physicist." However, for a particular application, it provides a to-be-classified named entity of Einstein, and the candidate types are "person" and "organization." Obviously, the LOD node corresponds to the to-be-classified named entity. However, from the tagged type "physicist," it cannot be directly derived that this to-be-classified named entity belongs to the type of "person." Hereinafter, how to compute a possibility of the to-be-classified named entity belonging to each candidate type based on the tagged type in this scenario is described in detail with reference to FIG. 3.

Figure 3:
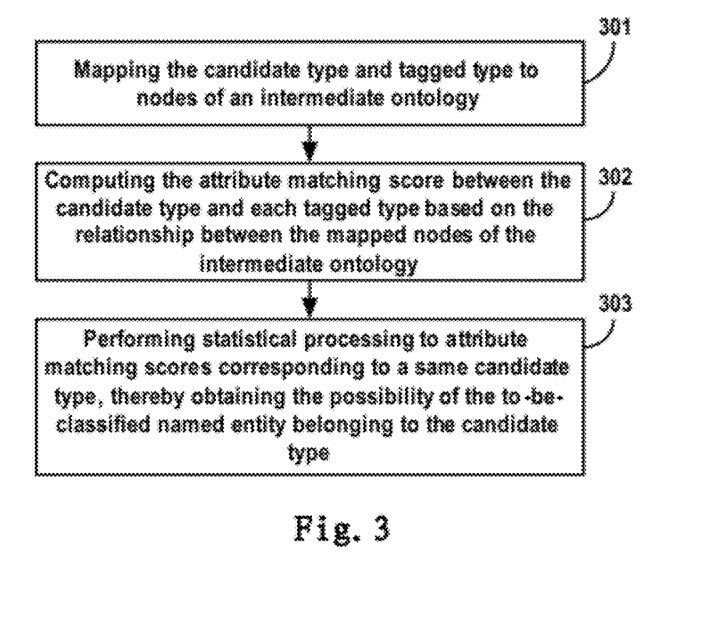
FIG. 3 is an illustration of another methodology for computing a named entity based on a tagged type belonging to each candidate type according to another embodiment of the present invention.

In Step 301, the candidate type and tagged type are mapped to a node of intermediate ontology. The intermediate ontology is essentially a knowledge base for recording data structures of correlation relationships between types used in different classification approaches. The types are a node of the intermediate ontology. The relationship may be a generic-specific relationship. For example, the type "person" is a generic type for the type "male;" or an identical relationship, for example "computing machine" and "computer;" or a homologous relationship, for example both "male" and "female" are specific types of "person;" and of course, it may be a conflicting relationship.

A plurality of existing methods may be used to map the candidate type and tagged type to a node of the intermediate ontology, for example a word-level approach, which compares the character similarities between the candidate type or tagged type and the type represented by a node of the intermediate ontology; for another example a semantic-level approach, which compares the semantic similarities between the candidate type or tagged type and the type represented by a node of the intermediate ontology. Various kinds of specific approaches will not be detailed here.

In Step 302, an attribute matching score between the candidate types and each tagged type is computed based on the relationship between mapped nodes of the intermediate ontology. As previously mentioned, various kinds of relationships may exist between the intermediate ontology nodes to which the candidate types and the tagged type is mapped. These relationships may be quantified with various kinds of approaches, as long as the approach can embody the differences between various kinds of correlation relationships. For example, intuitively, for candidate types and tagged types mapped to a same node of the intermediate ontology or mapped to two nodes of the intermediate ontology having an identical relationship, their attribute matching score should be higher than the candidate types and tagged types mapped to two nodes of the intermediate ontology having a genetic-specific relationship. Hereinafter, a quantification method according to an embodiment of the present invention will be described. The skilled in the art may easily figure out other approaches to compute the attribute matching score.

TABLE 1

Exemplary Quantification Method

| Correlation relationship | Attribute matching score |
| --- | --- |
| identical | 1 |
| conflict | −1 |
| General-specific | 1/n, where n indicates the number of nodes between two mapped nodes of the intermediate ontology (excluding the two mapped nodes of the intermediate ontology per se) +1 |
| homologous | 1/(n1 + n2), where n1 and n2 indicate the numbers of nodes from two mapped nodes of the intermediate ontology to a common source node, respectively (excluding the number of two intermediate ontology nodes per se and the common source node) +1 |
| No mapping | 0 |

The skilled in the art may understand, the types included in an actual intermediate ontology are limited. Therefore, a circumstance that a candidate type or tagged type cannot be appropriately mapped to a node of the intermediate ontology may arise, i.e., the no mapping circumstance in the above table. In this case, the attribute matching score may be determined to be 0.

Figure 4:
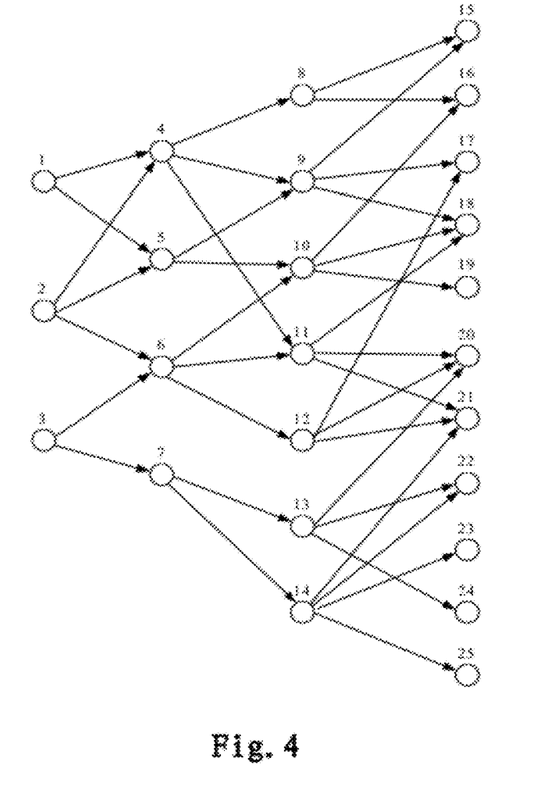
FIG. 4 is an illustration of exemplarily embodiment having an intermediate ontology.

For example, suppose the structure of the intermediate ontology is as shown in FIG. 4. According to the above quantification method, the intermediate ontology node 11 and the intermediate ontology node 18 have a specific-generic relationship, and the attribute matching score between the tagged type and candidate type mapped to the intermediate ontology nodes 11 and 18 respectively is ½; the intermediate ontology node 15 and intermediate ontology node 20 have a homologous relationship, and the attribute matching score between the tagged type and candidate type mapped to the intermediate ontology modes 15 and 20 respectively is ⅙.

What is described above is how to obtain an attribute matching score between a candidate type and a tagged type. As previously mentioned, in the LOD data, there may be a plurality of LOD nodes corresponding to the to-be-classified named entity and the types tagged for each LOD node. Therefore, for a candidate type, a plurality of attribute matching scores may exist.

In Step 303, statistical processing is performed to each attribute matching score corresponding to a same candidate type, thereby obtaining a possibility of the to-be-classified named entity belonging to the candidate type.

As a simplest statistical processing method, weighting average may be performed to the plurality of attribute matching scores as the possibility. Weight of the weighting average may be the same to each attribute matching score or determined based on some characteristics of the LOD node. As previously mentioned, an LOD node typically corresponds to a web page, thus the visited times of the web page may be used for weighting. In addition, the LOD node may be originated from different LOD data sets, thus the credibility degrees of these data sets may be used for weighting.

In a method according to an embodiment of the present invention, name attributes of a to-be-classified named entity and an LOD node are used to search the LOD node corresponding to the to-be-classified named entity; the type attribute of the LOD node corresponding to the to-be-classified named entity is determined as a tagged type of the to-be-classified named entity. In actual application, due to lack of normalization in web data, the name attribute entry and type attribute entry of an LOD node need pre-processing before use.

The pre-processing may for example be processing to the name attribute entry. A publisher, when setting a name attribute entry for an LOD node, though an entry may be taken as a name attribute entry, what is recorded by this entry might be non-name information just set for the convenience of the publisher; or the publisher has a misunderstanding on the information which should be recorded for the entry. Through considerable statistics and studies, the inventors of the present invention find that the name attribute as specified in the name attribute entry has a high possibility of consistency with the name which the corresponding LOD node should have, when the name attribute entry has rdfs: label or dbpedia: birthname or foaf: name as a predicate. Thus, at step 201, an LOD node corresponding to the to-be-classified named entity may be determined by comparing the name attributes as specified in the attribute entries in the to-be-classified named entity and the LOD node with rdfs: label or dbpedia: birthname or foaf: name as a predicate.

The pre-processing may be processing to other attribute entries. For example, there is an LOD node which includes attribute entries specifying the relationship between this LOD node and another LOD node. A typical relationship is "redirect." For example, an attribute entry of the LOD node A specifies that the LOD node A has a "redirect" relationship with the LOD node B, which indicates that each attribute of the LOD node B is adapted to the LOD node A.

The pre-processing step may be implemented offline, i.e., the preprocessing step is not performed in responsive to reception of the candidate type and to-be-classified named entity, but processing is performed to the LOD data set in advance to obtain a pair comprising a name attribute and a type attribute. And then, in responsive to reception of the candidate type and to-be-classified named entity, firstly, step 201 is implemented with the name attribute in the pair, and then step 202 is implemented with the type attribute in the pair.

When recording the pairs, for the same name attribute, those pairs corresponding to the same LOD node may be further recorded. On one hand, an LOD node may have a plurality of type attribute entries to specify different type attributes, respectively. On the other hand, different LOD nodes may have the same name attribute. Thus, a plurality of pairs which have the same name attribute but different type attributes may exist, and these pairs may correspond to different LOD nodes. It should be noted that though this scenario is described with a plurality of pairs, only one record may be needed to actually store these pairs. This record may even specify a plurality of pairs corresponding to different LOD nodes. The skilled in the art may design various formats for records, so as to specify a plurality of type attributes corresponding to a same name attribute in a same record, and identify which type attributes correspond to a same LOD node and which type attributes correspond to another LOD node.

In the case of further recording which pairs correspond to a same LOD node, i.e., in the case of recording the correspondence relationship between the type attribute and the LOD node, at step 303, a correspondence relationship between the type attribute and the LOD node will be used firstly to convert the attribute matching score into a node matching score, and then statistical processing is performed to each node matching score corresponding to a same candidate type, thereby obtaining a possibility of the to-be-classified named entity belonging to the candidate type.

Specifically, if an LOD node comprises a plurality of type attributes, then a plurality of attribute matching scores corresponding to the LOD node may be obtained. The node matching score may be obtained by averaging a plurality of attribute matching scores corresponding to a same LOD node or selecting a maximum value thereof. Converting the attribute matching scores into a node matching score helps reduce the noise brought by the type attribute entry per se.

Further, whether an attribute matching score indicating presence of confliction exists in a plurality of attribute matching scores corresponding to a same LOD node may be determined. As previously mentioned, the attribute matching score is computed based on the correlation relationship between nodes of the intermediate ontology to which the candidate type and tagged type are mapped. A correlation relationship between the nodes of the intermediate ontology may be an identical relationship, a generic-specific relationship, a homologous relationship, or a conflicting relationship. If an attribute matching score indicating presence of a confliction, then the value of the attribute matching score indicating presence of a confliction is determined as the node matching score of the LOD node. That is because, whether it be a comparison between the to-be-classified named entity and the name attribute or a mapping from a tagged type or a candidate type to an intermediate ontology node, fuzzy matching is used in most cases, thereby there is a possibility for error. If an attribute matching score as computed between a candidate type and a tagged type corresponding to a same LOD node indicates a conflicting relationship, then an error might occur during performing the fuzzy matching, thereby also setting the node matching score to indicating a confliction relationship. Further, a vote mechanism may be used to determine whether to set the node matching score to indicating a conflicting relationship. Specifically, by comparing between a first number of attribute matching scores which indicate presence of a confliction relationship and a second number of attribute matching scores which indicate absence of a confliction relationship in the attribute matching scores as computed between a candidate type and a plurality of tagged types corresponding to a same LOD node, whether to set the node matching score to indicating a confliction relationship is determined. For example, when a first number is greater than the second number, the node matching score is set to indicating a confliction relationship, or when the percentage of the first number to the second number is greater than a threshold value, the node matching score is set to indicating a confliction relationship.

After obtaining a plurality of node matching scores corresponding to a same candidate type, statistical processing such as averaging or weight averaging may be performed to these node matching scores, thereby obtaining a possibility of the to-be-classified named entity belonging to the candidate type.

Figure 5:
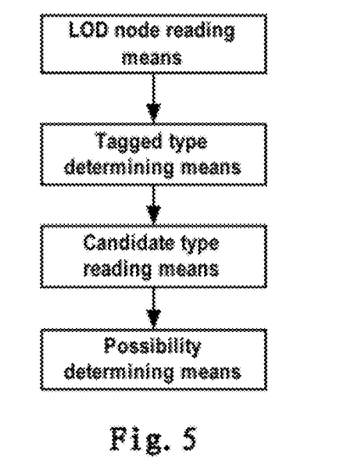
FIG. 5 is an illustration of an apparatus used for named entity classification according to an embodiment of the present invention.

FIG. 5 shows an apparatus for named entity classification according to an embodiment of the present invention. The apparatus comprises: LOD node reading means configured to read an LOD (Linking Opening Data) node corresponding to a to-be-classified named entity from a LOD data set; tagged type determining means configured to determine a type attribute of the LOD node corresponding to the to-be-classified named entity as a tagged type of the to-be-classified named entity; candidate type reading means configured to read a candidate type; and possibility determining means configured to compute, based on the tagged type, a possibility of the to-be-classified named entity belonging to the candidate type.

The normally skilled in the art may understand that the above method and system may be implemented with a computer-executable instruction and/or in a processor control code, for example, such code is provided on a bearer medium such as a magnetic disk, CD, or DVD-ROM, or a programmable memory such as a read-only memory (firmware) or a data bearer such as an optical or electronic signal bearer. The system and its components for controlling energy consumption of a mobile device in the present embodiment may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

Though a plurality of exemplary embodiments of the present invention have been illustrated and depicted, the skilled in the art would appreciate that without departing from the principle and spirit of the present invention, change may be made to these embodiments, and the scope of the present invention is limited by the appending claims and equivalent variation thereof.

What is claimed is:

1. A method of providing a named entity classification in a computing system, the method comprising:
    reading, from an LOD (Linking Opening Data) set, an LOD node corresponding to a to-be-classified named entity, wherein the LOD node is associated with a uniform resource identifier and corresponds to a web page, the LOD node further comprising at least a plurality of property entries;
    determining a type attribute of the LOD node corresponding to the to-be-classified named entity as a tagged type of the to-be classified named entity;
    reading a candidate type;
    computing a possibility of the to be-classified named entity belonging to the candidate type, comprising:
        mapping the candidate type to a node of an intermediate ontology, wherein the intermediate ontology includes at least a structured correlation of generic-specific relationships, the generic-specific relationships including at least an identical relationship, a homologous relationship and a conflicting relationship;
        computing an attribute matching score between the candidate type and the tagged type based on a relationship between the mapped node of intermediate ontology and the candidate type, wherein computing the attribute matching score of a mapped intermediate ontology having an identical type is based on a predetermined value, the attribute matching score of a mapped intermediate ontology having a generic-specific relationship is based on the predetermined value and a first count of nodes between two mapped nodes of the intermediate ontology, and the attribute matching score of a mapped intermediate ontology having a homologue relationship is based on the predetermined value and a second count of nodes between two mapped nodes of the of the intermediate ontology to a common source node and a third count of nodes between two mapped nodes of the of the intermediate ontology to the common source node;

performing statistical processing to attribute matching scores corresponding to the candidate type to obtain a possibility of the to-be classified named entity belonging to the candidate type, wherein performing statistical processing to each attribute matching score corresponding to a same candidate type further comprising:

converting the attribute matching scores to a node matching score based on the correspondence relationship between the attribute matching scores and the LOD node in order to reduce type attribute entry noise;

performing statistical processing to each node matching score corresponding to a same candidate type, thereby obtaining a possibility of the to-be-classified named entity belonging to the candidate type; and selecting one or more tagged types based on satisfaction of an attribute matching score threshold.

2. The method according to claim 1, wherein performing the statistical processing to each attribute matching score corresponding to the same candidate type further comprising:

performing weight averaging to the attribute matching scores based on characteristics of the LOD nodes corresponding to the attribute matching scores.

3. The method according to claim 1, wherein reading the LOD node corresponding to the to-be-classified named entity from an LOD data set further comprising:

determining an LOD node corresponding to the to-be-classified named entity by comparing the to-be-classified named entity with a name attribute as specified in the LOD node's attribute entry with a predicate of any of:
rdfs: label;
dbpedia: birthname; or
foaf: name.

4. The method according to claim 1, further comprising:
determining an LOD node having a redirect relationship with the LOD node corresponding to the to-be classified named entity as another LOD node corresponding to the to-be-classified named entity.

5. The method according to claim 1, wherein converting the attribute matching scores to the node matching score further comprising:

averaging a plurality of attribute matching scores corresponding to a same LOD node, in order to obtain the node matching score.

6. The method according to claim 1, wherein converting the attribute matching scores to the node matching score further comprising:

selecting a maximum value from a plurality of attribute matching scores corresponding to a same LOD node as the node matching score.

7. The method according to claim 1, wherein converting the attribute matching scores to a node matching score further comprising:

indicating presence of a conflict if an attribute matching score exists among the attribute matching scores corresponding to the same candidate type; and setting the corresponding node matching index to indicating presence of confliction.

8. The method according to claim 7, further comprising:
determining to set the node matching score to indicating presence of confliction based on a relationship between the number of attribute matching scores indicating presence of confliction and the number of attribute matching scores indicating absence of confliction in the attribute matching scores corresponding to the same candidate type.

9. An apparatus for named entity classification, comprising:

LOD node reading means configured to read an LOD (Linking Opening Data) node corresponding to a to-be-classified named entity from an LOD data set, wherein the LOD node is associated with an uniform resource identifier (URI) and corresponds to a web page, the LOD node further comprising at least a plurality of property entries;

tagged type determining means configured to determine a type attribute of the LOD node corresponding to the to-be-classified named entity as a tagged type of the to-be-classified named entity;

candidate type reading means configured to read a candidate type;

possibility determining means configured to compute, based on the tagged type, a possibility of the to-be-classified named entity belonging to the candidate type, further comprising:

mapping means configured to map the candidate type to a node of an intermediate ontology, wherein the intermediate ontology includes at least a structured correlation of generic-specific relationships, the generic-specific relationships including at least an identical relationship, a homologous relationship and a conflicting relationship;

computing means configured to compute an attribute matching score between the candidate type and the tagged type based on a relationship between the mapped node of intermediate ontology and the candidate type, wherein computing the attribute matching score of a mapped intermediate ontology having an identical type is based on a predetermined vale, the attribute matching score of a mapped intermediate ontology having a generic-specific relationship is based on the predetermined value and a first count of nodes between two mapped nodes of the intermediate ontology, and the attribute matching score of a mapped intermediate ontology having a homologue relationship is based on the predetermined value and a second count of nodes between two mapped nodes of the of the intermediate ontology to a common source node and a third count of nodes between two mapped nodes of the of the intermediate ontology to the common source node;

performing means configured to perform statistical processing to attribute matching scores corresponding to a same candidate type, thereby obtaining a possibility of the to-be classified named entity belonging to the candidate type, wherein performing statistical processing to each attribute matching score corresponding to a same candidate type, thereby obtaining a possibility of the to-be-classified named entity belonging to the candidate type futher comprising:

converting means configured to convert the attribute matching scores to a node matching score based on the correspondence relationship between the attribute matching scores and the LOD node in order to reduce type attribute entry noise;

performing means configured to perform statistical processing to each node matching score corresponding to a same candidate type, thereby obtaining a possibility of the to-be-classified named entity belonging to the candidate type; and selecting means configured to select one or more tagged types based on satisfaction of an attribute matching score threshold.

10. The apparatus according to claim 9, wherein the means configured to perform statistical processing to each attribute matching score corresponding to the same candidate type, thereby obtaining a possibility of the to-be-classified named entity belonging to the candidate type further comprising:

means configured to perform weight averaging to the plurality of attribute matching scores based on characteristics of the LOD nodes corresponding to the attribute matching scores.

11. The apparatus according to claim 9, wherein the LOD node reading means further comprising:

means configured to determine an LOD node corresponding to the to-be classified named entity by comparing the to-be-classified named entity with a name attribute as specified in the LOD node's attribute entry with a predicate of any of:

rdfs: label;
dbpedia: birthname; or
foaf: name.

12. The apparatus according to claim 9, further comprising:

means configured to determine an LOD node having a redirect relationship with the LOD node corresponding to the to-be-classified named entity as another LOD node corresponding to the to-be-classified named entity.

13. The apparatus according to claim 9, wherein the means configured to convert the attribute matching scores to the node matching score further comprising:

means configured to average a plurality of attribute matching scores corresponding to a same LOD node, thereby obtaining the node matching score.

14. The apparatus according to claim 9, wherein the means configured to convert the attribute matching scores to the node matching score further comprising:

means configured to select a maximum value from a plurality of attribute matching scores corresponding to a same LOD node as the node matching score.

15. The apparatus according to claim 9, wherein the means configured to convert the attribute matching scores to the node matching score further comprising:

means configured to set, if an attribute matching score indicating presence of confliction exists among the attribute matching scores corresponding to the same candidate type, the node matching score to indicating presence of confliction.

16. The apparatus according to claim 9, further comprising:

means configured to determine whether to set the node matching score to indicating presence of confliction based on a relationship between the number of attribute matching scores indicating presence of confliction and the number of attribute matching scores indicating absence of confliction in the respective node matching score corresponding to a same candidate type.

* * * * *